Feb. 22, 1966  A. MOOSMANN  3,236,569
CARRIAGE GUIDE FOR MACHINE TOOLS OR THE LIKE
Filed Sept. 13, 1962

Inventor
Alois Moosmann
By
Watson, Cole, Grindle & Watson
Attys.

United States Patent Office 3,236,569
Patented Feb. 22, 1966

3,236,569
CARRIAGE GUIDE FOR MACHINE TOOLS
OR THE LIKE
Alois Moosmann, 11 Muttergartenweg,
Stuttgart-Birkach, Germany
Filed Sept. 13, 1962, Ser. No. 223,566
Claims priority, application Germany, Sept. 15, 1961,
M 50,317
3 Claims. (Cl. 308—6)

The present invention relates to a carriage guide for linearily moved machine carriages, particularly for work piece or tool carriages of machine tools or the like.

The bearing way guides, which are still prevailing up to now in machine tools, in which the carriage is guided on a stationary machine bed by means of a flat or prismatic guide way do not fulfill, as is generally known, the always higher requirements for a friction- and play-free shifting and exact adjustment. The shifting of a carriage with very slow speed or by very little distances is particularly extremely difficult because of the adhesive friction designated as "stick slip." Thereby there is obtained instead of a uniform shifting movement a jerky gliding in very small dimensions, so that the surface qualtiy of the work piece to be machined as well as the exactness of adjustment to a specific position suffer considerably. This is particularly undesirable above all with modern automatic machine tools with automatic positioning.

Therefore it has already been proposed to replace the simple bearing way guides by antifriction body guides, in which roller or ball shaped antifriction bodies are supported between rails provided with antifriction body guide ways fastened on the carriage and on the carriage support respectively. The antifriction bodies are thereby guided between the hardened guide way rails in rod- or chain-shaped cages. In the known antifriction body guides of this kind the guide way rails reposing on a surface are fastened by means of screws on the appertaining machine bodies. Such guides work indeed with less friction and play than the bearing way guides, but they have the disadvantage that they can be loaded under the condition of a rigid power reception only in one direction. With alternating load direction they are elastic corresponding to the elongation of the screws which must receive the load in one direction. The antifriction bodies carry then practically only in the vicinity of the rail fastening screws, while the rails which are not sufficiently rigid, because of the little possible section bend between the screws when there are loads. Other known carriage guides with V-shaped and flat guides can only be used if the direction of force and the own weight of the carriage are essentially of the same direction. An inversion of the direction of the power is possible only with forces, which are considerably smaller than the own weight of the carriage.

It is the purpose of the invention to improve and arrange the carriage guides working with antifriction bodies in such a way that the disadvantages of the antifriction body guides known up to now are avoided and besides further advantages are obtained.

The invention is essentially seen in the fact that the antifriction body bearing way rails are of triangular or trapezoidal or similar section and that they are imbedded in corresponding prismatic or similar grooves of the carriage support and the carriage respectively. Such an antifriction body carriage guide guarantees an absolutely rigid reception of the forces on all spots of its length and is suitable as well for obtaining any preload as also for work with any change of the direction of force.

By the imbedding according to the invention of the hardened guide way rails in prismatic grooves of the machine bodies surrounding them, e.g. of a carriage supporting body and a clamping table, the requirements of the practical work to an as unelastic connection as possible of the bearing way rails with the corresponding machine bodies, are perfectly fulfilled also in respect of all possible directions of the forces to be received. As the antifriction bodies get everywhere a firm support, there is obtained over the full length of the guide a uniform and rigid carrying capacity. A further important advantage is that the prismatic guide ways in the machine bodies can be produced in a relatively simple and cheap manner.

Preferably always two bearing way rails are arranged in opposite prismatical grooves of the carriage and the carriage support, whereby their antifriction body guide ways face each other. For guiding a carriage, e.g. of a shiftable clamping table in a carriage bed or carriage supporting body such antifriction body guides are arranged on both sides of the carriage, whereby the carriage is guided on both sides practically without any play. For carriage guides, in which temperature differences can arise between the carriage and the carriage support, the antifriction body guides can, according to the invention, also be configurated and arranged in such a manner, that one of the two lateral carriage guides is suitable for receiving the heat dilatations.

It is furthermore possible according to an advantageous arrangement of the invention, to adjust in simple manner the play respectively the preload of the antifriction body guides. For this purpose at least one bearing way rail is conically tapered in its longitudinal direction and is supported in a longitudinally shiftable and adjustable manner in a corresponding conically tapered prismatic groove. The shifting and adjustment of the conical bearing way rail can be effected e.g. by means of an adjustment screw. If a corresponding small pitch of the conical bearing way rail in its prism of about 1:200 up to 1:300 is used, there is obtained an extremely fine adjustment possibility which because of the unelastic supporting of the bearing way rails in the machine bodies becomes indeed effective to its full extent.

In the drawings the invention is shown as an example in two embodiments.

Figure 1:
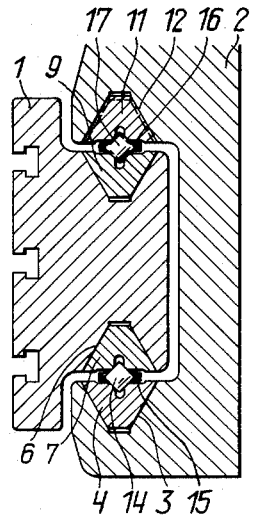
FIG. 1 shows in a section according to the line A–B of FIG. 2 a relatively narrow antifriction body guide, which is adjustable in its play of a clamping table in a carriage support or carriage bed.
Figure 2:
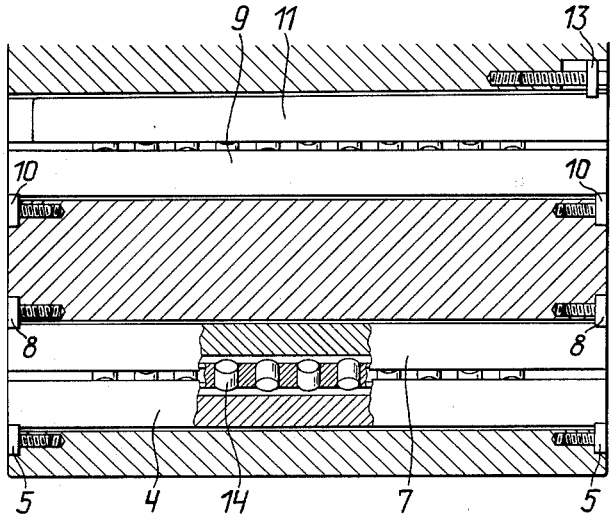
FIG. 2 shows the antifriction body guide according to FIG. 1 in a longitudinal section with partially cut bearing way rails and, FIG. 3 shows a section through a relatively wide antifriction body carriage guide with a power-reception rigid on one side towards all directions and on the other side only in one direction.

In the antifriction body guide represented in FIGS. 1 and 2 a clamping table 1 is shiftably guided in a carriage support 2. In a prismatic groove 3 of the body of the carriage support 2 there is imbedded hardened bearing way rail 4 of trapezoidal section and is fixed by two screws 5 against axial shifting. Correspondingly there is imbedded in a groove 6 of the clamping table 1 opposite to the prism 3 a trapezoidal hardened guide way rail 7, which is also fastened against axial shifting by screws 8.

On the other side of the clamping table 1 there is imbedded in a prismatical groove of the table a trapezoidal bearing way rail 9 in the same manner as the rail 7 in the prism 6 and is fixed by means of two screws 10 against axial shifting. The opposite guide way rail 11 on the other hand has also indeed a trapezoidal or triangular section, but it is, as is shown by FIGURES 1 and 2, conically tapered along its length and is supported in a longudinally shiftable and adjustable manner in its tapered prismatical groove 12 of the carriage support body 2, which is conically tapered in its longitudinal direction. The axial shifting of the conical guide way rail 11 is preferably effected by a screw 13. The pitch of the conical guide way rail 11 in the prismatical groove 12 may preferably be 1:200 to 1:300 without the invention being limited to this value. The term 1:200 to 1:300 is a value for the amount of the pitch or the gradient angle of the conically tapered guide way rail 11 (FIGS. 1 and 2), i.e. the degree of increasing in the length of the rail 11 is e.g. 1 mm. on a length of 200 mm. or 300 mm. The side angle of the prisms 3, 6, 12 amounts e.g., to 60°, but it may also be chosen larger or smaller.

Between the guide way surfaces of the guide way rails 4 and 7 the antifriction bearings are carried preferably crosswise in the form of rollers 14, i.e. alternately offset with their axes by 90° and they are guided or held by a cage rail 15. In the same manner the rollers 17 guided by means of a cage rail and arranged likewise crosswise, are inserted between the guide way rails 9 and 11. It be said here that for a smaller load instead of the rollers 14 and 17 with a corresponding configuration of the guide ways also balls may be arranged between the guide way rails 4 and 7 respectively 9 and 11. Each roller 14 and 17 is provided with a cage rail 15 and 16, respectively.

The shifting of the conically tapering guide way rail 11 in the corresponding prismatic groove 12 by means of the adjusting screw 13 makes possible a preload of the two roller sets 14 and 17 and a corresponding preload of the rollers. According to Muzzoil thereby the friction value of the roller friction sinks considerably, so that the shifting force does not increase essentially by the preload. By the exactly preloaded antifriction body guide also the rigidity of e.g. overhanging clamping carriages is improved. Muzzoli is the name of an Italian technologist, who has made experiments and tests relating to the friction of roller bearings, and therefore "Muzzoli" is a measure for friction values. The adjustment of the bearings is effected by longitudinally shifting the conically tapered guide way rail 11 by means of the screw 13.

Figure 3:
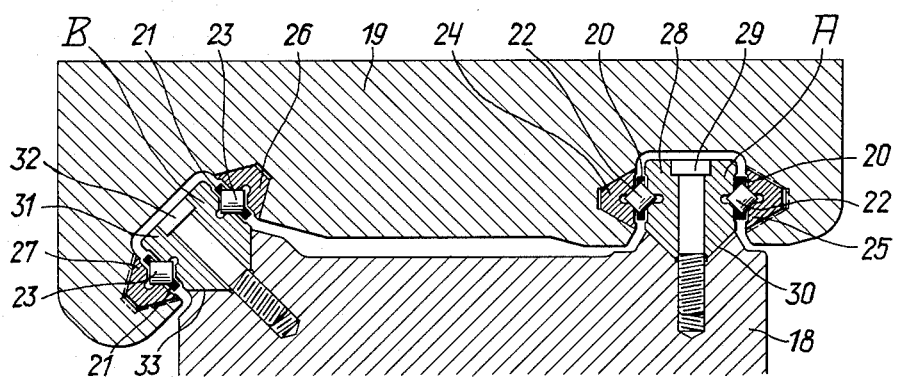

The further embodiment of the invention represented in FIG. 3 is particularly suitable for larger or wider carriage guides, in which temperature differences are to be expected between a carriage support 18 and the carriage, e.g., a clamping table 19.

In this case there are provided on both sides of the carriage of the clamping table antifriction body guides arranged in a different manner, which are designated in FIG. 3 in total with A and B. The guide A has a configuration so that it may receive forces in all directions. It determines thus the direction of movement of the clamping table 19 horizontally resp. laterally as well as also vertically. The guide B is arranged, on the contrary, in such a manner, that it receives only forces in vertical direction, while it is laterally free in order to adapt itself to the temperature differences or heat dilatations. In spite of the fact that the two guides A and B have thus to fulfill different tasks, they can be manufactured essentially by means of the same construction elements with the exception of the cage ridges or cage rails 20 and 21. While the cage rails 20 of the guide A receive the appertaining rollers 22 corresponding to the embodiment according to FIGS. 1 and 2 in a cross-wise manner, the rollers 23 of the guide B are received by the cake rails 21 in a parallel manner. Thus the guide B is movable in lateral direction because the rollers 23 of the guide B are received by the cage rails 21 in a parallel manner.

The guide way rail 24 of the guide A and the guide way rail 26 of the guide B are imbedded firmly in the appertaining prismatical grooves of the clamping table 19 as this is the case with the guide way rails 4, 7 and 9 of the embodiment according to FIGS. 1 and 2. The guide way rail 25 of the guide A and the guide way rail 27 of the guide B are likewise conically configurated just as the guide way rail 11 according to the embodiment in FIGS. 1 and 2 in their longitudinal direction and they are guided in corresponding prismatical grooves, so that they may be shifted in their longitudinal direction. In this manner also in this case the play or the preload of the guides A and B may be adjusted.

Between the guide way rails 24 and 25 there is arranged in the guide A a middle rail 28, which contains the counter guide ways for the rollers 22. The rail foot of the middle rail 28 is of triangular or prismatic section and is imbedded in a corresponding prismatical groove 30 of the carriage support body 18. By means of screws 29 the middle rail 28 is firmly pressed into the prism 30. In the guide B there is likewise arranged a middle rail 31 between the guide way rails 26 and 27 as a counter-guide for the rollers 23 and is pressed by means of screws 32 into a prismatic groove of the carriage support body 18. A part of the already cited difference of the cage rails 20 and 21 the guides A and B are besides different only by the fact that the guide B is rotated respectively offset towards the guide A by 45°. Apart from this the same elements may be used for both guides, whereby the high grade guide way rails and middle rails can be manufactured in an economical way.

The imbedding of the middle rails 28 and 31 in the prismatic receiving grooves 30 and 33 of the carriage bed has the advantage that the position of these middle rails is very exactly determined, so that they can easily be dismantled and mounted again if necessary. As the sections of the middle rails 28 and 31 can be relatively largely dimensioned, it is possible to make the fastening screws 29 and 32 in a very sturdy manner and to provide them in any number. Thereby an absolutely sure connection of the middle rails 28, 31 with the carriage supporting body 18 is guaranteed.

The carriage guide shown in FIG. 3 and described herein before has furthermore the essential advantage for the production that the two middle rails 28 and 31 can be screwed onto the carriage supporting body 18 for themselves alone, i.e., without the clamping table 19 with the guide way rails 24, 25 respectively 26 and 27 and the cage rails 20 respectively 21 and that they can be checked for their parallel situation by scanning the roller guide ways. Possibly also the direction may be corrected e.g. by shaving of the prisms 30 and 33. Likewise the complete antifriction body guide can be incorporated without the carriage supporting body 18 into the clamping table 19, can be controlled exactly in respect of direction, carrying of the rollers on all the points of the guide as well as the desired preload and may possibly be retouched and corrected.

In the drawing the dash lines of FIGS. 1 and 3 show the conical tapering of the guide way rails 11, 25 and 27.

On the basis of the drawing two particularly advantageous embodiments of the invention were described hereinbefore. It is evident that the invention is not limited to these embodiments but it comprises all the variations within the frame of the essential inventive idea. The antifriction body guides according to the invention are destined particularly for the linearily moved carriages of machine tools but they are, if necessary, also suitable for guiding similar carriages of other machines.

I claim:

1. A guide for rectilinearily moving a clamping table on a carriage support of machine tools and the like comprising a pair of rectilinear guide way rails forming guide ways in the clamping table, the clamping table having a pair of grooves therein and each having a cross section of substantially frusto-conical shape, the guide way rails being each of substantially frusto-conical cross section to fit into its prospective frusto-conical groove in the clamping table, a middle rail secured on the carriage support in a groove therein so that the middle rail is partially embedded in the groove, the partially embedded portion of middle rail being substantially triangular in cross-section to fit into a substantially triangular groove in the carriage support, and a plurality of anti-friction bodies arranged between the middle rail and each of the pair of rectilinear guide way rails.

2. A guide according to claim 1, in which means are provided in the form of a screw to secure the middle rail on the carriage support and the screw being in threaded engagement in the carriage support.

3. A guide according to claim 1, in which the anti-friction bodies are each in the form of a roller to roll on surfaces on the guide way rail and the middle rail.

References Cited by the Examiner

UNITED STATES PATENTS

| | | | |
|---|---|---|---|
| 707,155 | 8/1902 | Osgood | 308—3 |
| 1,026,389 | 5/1912 | Garvin et al. | 90—15 |
| 1,121,150 | 12/1914 | Turner | 308—223 |
| 1,811,508 | 6/1931 | Klages | 90—58 |
| 2,291,665 | 8/1942 | Turrettini | 308—6 |
| 2,299,677 | 10/1942 | Bickel | 308—3 |
| 2,721,776 | 10/1955 | Ruist | 308—6 |
| 3,024,073 | 3/1962 | Krueger | 308—6 |

FOREIGN PATENTS

| | | |
|---|---|---|
| 111,321 | 9/1940 | Australia. |
| 856,317 | 3/1940 | France. |
| 473,026 | 10/1937 | Great Britain. |

DON A. WAITE, *Primary Examiner.*

FRANK R. SUSKO, ROBERT C. RIORDON, *Examiners.*